Figure 1:
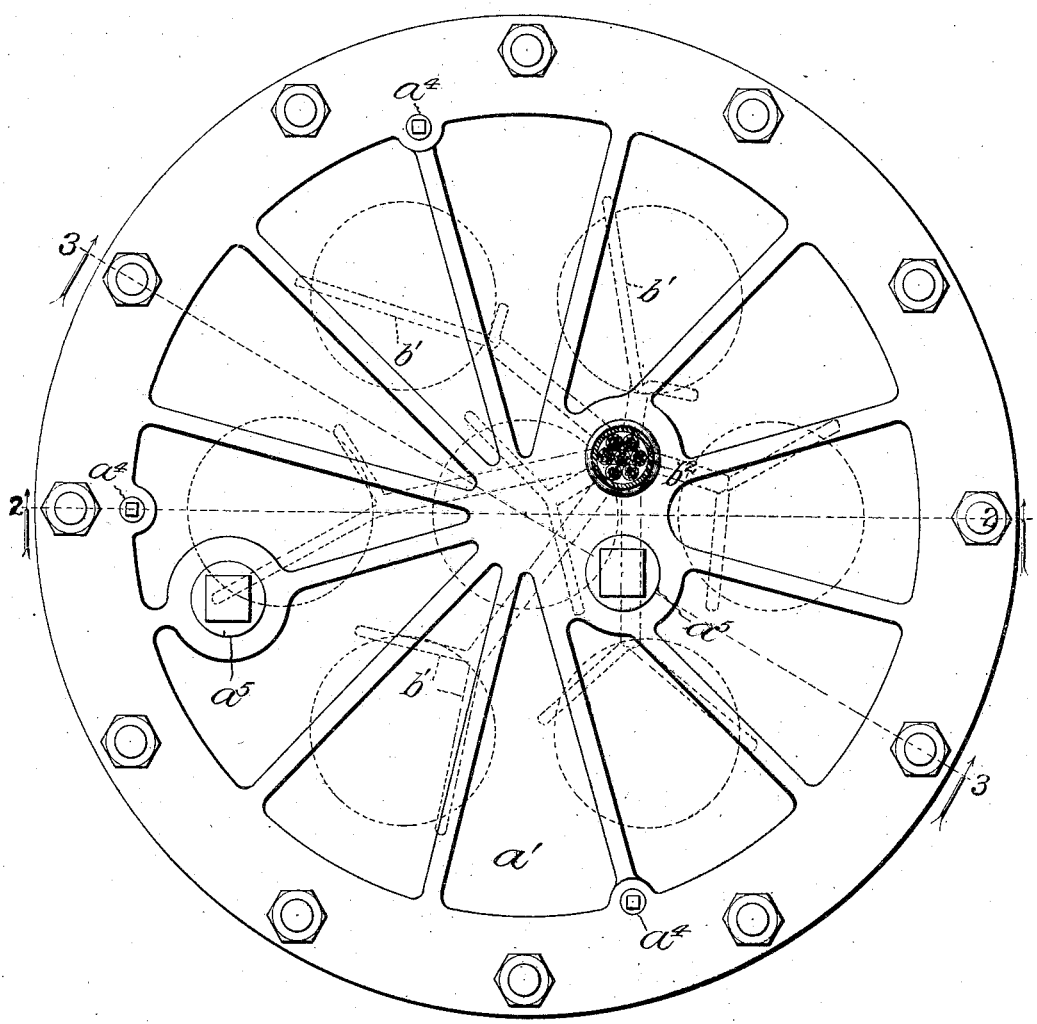

No. 834,352. PATENTED OCT. 30, 1906.
H. F. ALBRIGHT.
CASE FOR LOADING COILS.
APPLICATION FILED APR. 22, 1905.

3 SHEETS—SHEET 1.

Witnesses:

Inventor:
Henry F. Albright,
By Burton Tanner
Attys

No. 834,352. PATENTED OCT. 30, 1906.
H. F. ALBRIGHT.
CASE FOR LOADING COILS.
APPLICATION FILED APR. 22, 1905.
3 SHEETS—SHEET 2.
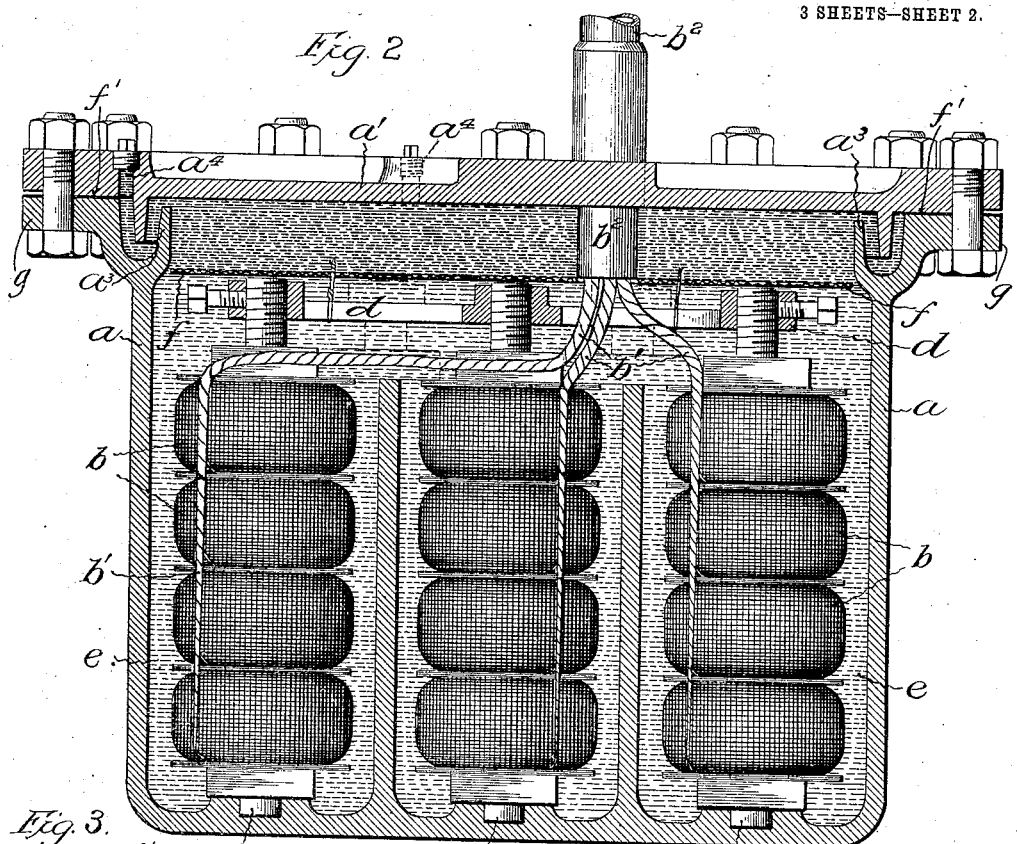
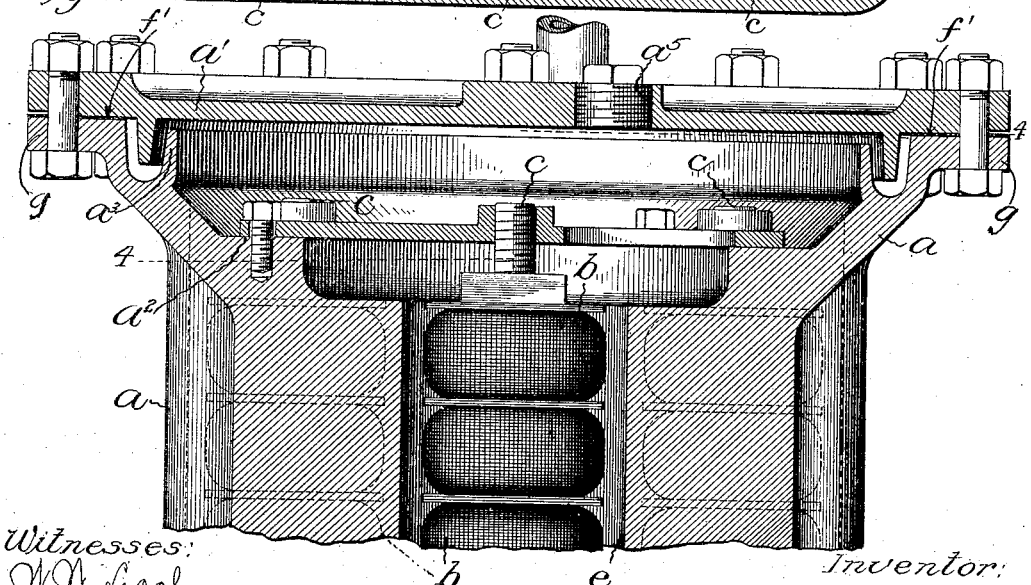
Witnesses:
Inventor:
Henry F. Albright,
By Barton Tanner
Att'ys

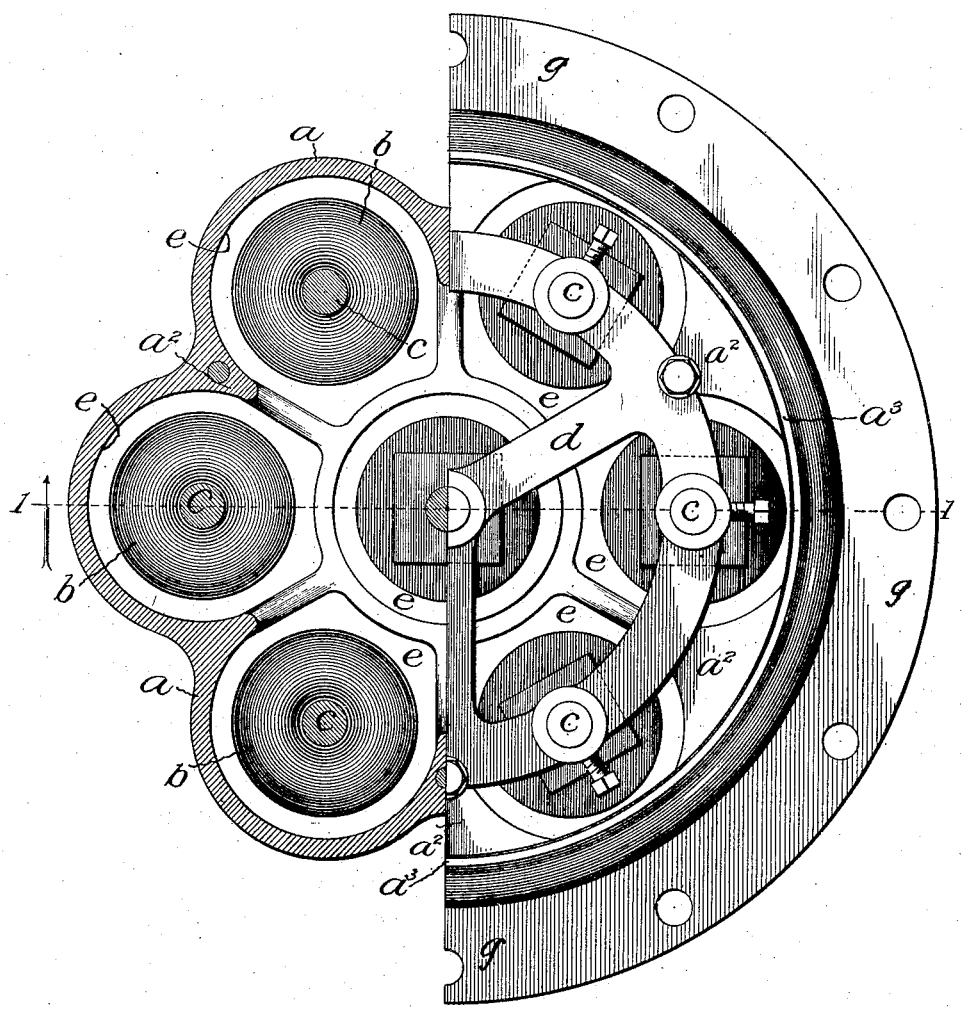

UNITED STATES PATENT OFFICE.

HENRY F. ALBRIGHT, OF NEW YORK, N. Y., ASSIGNOR TO WESTERN ELECTRIC COMPANY, OF CHICAGO, ILLINOIS, A CORPORATION OF ILLINOIS.

CASE FOR LOADING-COILS.

No. 834,352.　　　Specification of Letters Patent.　　　Patented Oct. 30, 1906.

Application filed April 22, 1905. Serial No. 256,965.

*To all whom it may concern:*

Be it known that I, HENRY F. ALBRIGHT, a citizen of the United States, residing at New York, in the county of New York and State of New York, have invented a certain new and useful Improvement in Cases for Loading-Coils, of which the following is a full, clear, concise, and exact description.

My invention relates to a case for loading-coils, and has for its object to compactly assemble and rigidly support a plurality of coils within a containing case or pot in such manner that they will be protected from injury and from atmospheric action or influence.

It is well known that by associating loading or impedance coils with the conductors or circuits of telephone-cables trouble due to the capacity or condensance of the cable-conductors may be avoided, since the impedance or inductive effect of the coils very nearly balances the capacity of the conductors. Heretofore these coils have simply been placed alongside a cable at the point or points where they are connected with the conductors thereof. This plan is objectionable, since the coils are left unprotected and subjected to injuries of many kinds, and coils when injured are very apt to derange and throw out of service the circuits of the cable-conductors.

In accordance with my invention I collect the coils into groups and provide containing-cases therefor, in each of which a number of the groups may be compactly and rigidly supported, the cases being hermetically sealed and provided with outlets for the connecting-wires of the coils. These cases may be disposed in proximity to the cables with which their coils are to be connected—for example, containing-cases of the loading-coils to be associated with the underground cables are located in the manholes. With my arrangement the coils are protected from injury of every kind and are assembled so as to take up the least room.

I will describe my invention particularly by reference to the accompanying drawings, wherein—

Figure 1 is a plan view of a case for loading-coils embodying my invention. Fig. 2 is a vertical sectional view of the case on line 2 2 of Fig. 1. Fig. 3 is a vertical sectional view of the case on line 3 3 of Fig. 1, and Fig. 4 is a sectional plan view on line 4 4 of Fig. 3.

The same letters of reference are used to designate the same parts wherever shown.

The case or pot $a$, which is preferably of iron, is arranged to receive a plurality of groups of loading or toroidal-shaped coils $b\ b$, adapted to be rigidly and compactly supported therein. I provide spindles or axial supports $c\ c$ for the groups of coils, which are rigidly mounted within the case, being preferably secured at their lower ends to the bottom of the case. These spindles may be of non-magnetic material—as, for example, wood. A spider $d$ is arranged to receive the upper ends of the spindles and is secured to the inner wall of the pot or case to maintain the spindles in rigid position. Conducting-wires $b'\ b'$ lead from the coils to the outside of the structure, preferably by way of a cable, sheath, or pipe $b^2$, which projects into the case through the cover $a'$ thereof, which is secured to the body of the case by bolts or other suitable means. The connecting-wires of each group may be brought together into a small cable and all of such small cables united into one, which passes out of the case at one point, being protected by the sheath $b^2$. The pot is preferably provided with an annular outwardly-projecting flange $f$, to which the cover is secured, a corrugated metallic washer $f'$ being interposed between said cover and flange.

I prefer to separate the groups of coils by partitions, and to this end may construct the case in cellular form—that is, so that it comprises a number of individual cells or chambers $e\ e$ for the groups extending nearly to the top of the case, the spider being supported above the cells by the flange $a^2$ upon the inner surface of the case, which flange forms a portion of the walls of the several cells. These partitions prevent cross-talk between coils of different groups.

The coils are preferably embedded in a sealing composition and the cover and case hermetically sealed. I preferably provide the wall of the pot near its upper edge with an upwardly-projecting flange $a^3$, which, together with the wall of the case, forms a gutter into which projects an annular rib upon the inner surface of the cover, holes $a^4$ being provided in the cover at intervals immediately outside the ribs and leading to the gutter. The cover may be provided with an opening or openings $a^5$, through which a sealing composition may be poured into the case. When the pot is filled, the composition enters the gutter and passes through the openings $a^4$, thus hermetically sealing the case.

In practice I prefer to surround the coils and fill the case with rosin and rosin-oil to the level of the spider before the cover is put on. I then fasten a partition $f$, preferably of cardboard, to the spider, secure the cover in place, and fill the balance of the case with hot asphaltum, which is poured through the openings $a^5$ in the cover until it oozes through the openings $a^4$ therein, when suitable plugs may be placed in the openings $a^4$ $a^5$, as shown in Fig. 1.

I claim—

1. The combination with a containing-case, of groups of loading-coils therein, connecting-wires leading from the coils to the exterior of the case, supporting-spindles for said groups of coils secured to the bottom of the case, a spider to which the free ends of said spindles are secured, supported by the inner wall of the case, and maintaining the spindles in a rigid position, and means for hermetically sealing said case.

2. The combination with a containing-case, of groups of loading-coils therein, supporting or axial spindles of non-magnetic material for said groups secured to the bottom of the case, a spider to which the free ends of said spindles are secured, supported by the inner wall of the case and maintaining the spindles in a rigid position, connecting-wires for said coils, a cable projecting within the case to the conductors whereof said connecting-wires are secured, a cover adapted to be secured to the case, and means for hermetically sealing said case.

3. The combination with a containing-case, of groups of loading-coils therein, supporting-spindles of non-magnetic material for said groups secured to the bottom of the case, a spider to which the free ends of said spindles are secured, supported by the inner wall of the case, to maintain said spindles in a rigid position, a sealing composition within the case in which said coils are embedded, connecting-wires for the coils, said wires being formed into a cable which leads to the outside of the case, a cover for the case, and means for hermetically sealing the cover to the case.

4. The combination with a containing-case, of groups of loading-coils rigidly supported therein, partitions formed integral with said base separating said groups, connecting-wires for said coils leading to the exterior of the case, a sealing composition within the case surrounding said coils, and means for sealing said case.

5. The combination with a containing-case, comprising a number of individual cells or chambers extending nearly to the top of the case, of a group of loading-coils within each cell, supporting-spindles of non-magnetic material for said groups, secured to the bottom of the case, a spider, to which the free ends of said spindles are secured, supported above said cells to maintain said spindles rigid, connecting-wires for said coils, a cover for the case having an outlet for said wires, and means for hermetically sealing said case.

6. In combination, a casing or box having a cover secured thereto, a series of cells within the box and formed integrally therewith, a spider mounted on said cells, a series of wooden spindles supported by the spider within the cells, groups of toroidal-shaped coils carried by said spindles, connections from said coils to the exterior of the box, and a sealing composition within said cells and box, whereby a hermetically-sealed casing is formed for the groups of coils.

7. The combination in a structure for loading-coils, of a series of cells formed integrally, each cell being adapted to support therein a spindle carrying a number of such loading-coils, with a cover for the body of said structure, and means for hermetically sealing the cover above said cells, substantially as and for the purpose specified.

8. A containing-case for loading-coils divided into cells by metallic partitions, formed integral therewith, spindles within said cells upon which said loading-coils are mounted, connecting-wires for said coils leading to the exterior of the case, and a sealing composition within said cells and case, whereby the sealing composition forms a hermetical seal for said case.

9. In a containing-case for loading-coils, the combination of a gutter, a flange formed integral with the containing-case, a cover adapted to be secured to said flange, an annular lip upon the cover projecting into said gutter, said cover having holes therein adapted to register with the gutter, plugs for said holes, a corrugated metallic washer between said cover and flange, and a sealing compound for sealing said projecting flange within said gutter, whereby a hermetical joint is formed between the cover and containing-case.

10. In a containing-case, the combination with a gutter formed at the top of the case, of a flange formed upon said case, a cover adapted to be secured to said flange, a downwardly-projecting flange upon the cover lying within said gutter, said cover having holes therein registering with the gutter, plugs for said holes, and a sealing compound for sealing said downwardly-projecting flange within the gutter; whereby a hermetical joint is formed between the cover and the case.

11. The combination with a containing-case, of groups of loading-coils within the case, supporting-spindles for said groups rigidly mounted within the case, connecting-wires for said coils leading to the exterior of the case, an annular gutter formed at the top of the case, a cover having a downwardly-projecting annular flange within said gutter, and a sealing compound within the gutter in which said flange is embedded, whereby the case is hermetically sealed.

In witness whereof I hereunto subscribe my name this 28th day of January, A. D. 1905.

HENRY F. ALBRIGHT.

Witnesses:
J. W. BAUCKER,
W. S. H. LOZIER.